Aug. 9, 1960     F. A. CARSTENS     2,948,061
METHOD OF FABRICATING CYLINDRICAL SHELL STRUCTURES
Filed Jan. 13, 1958
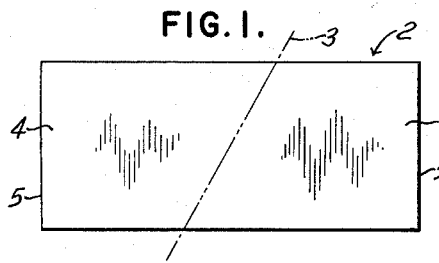
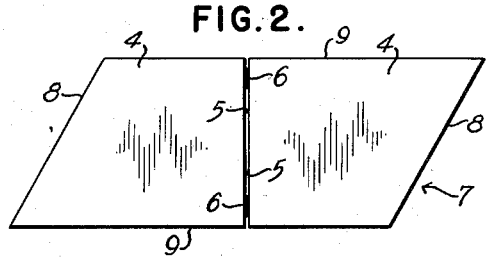
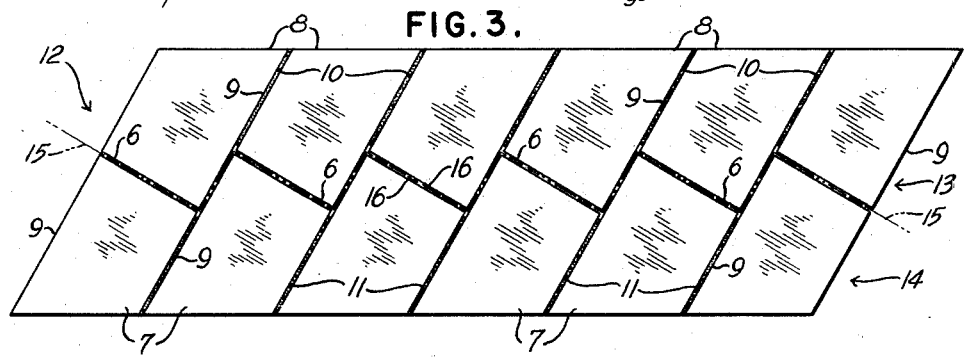
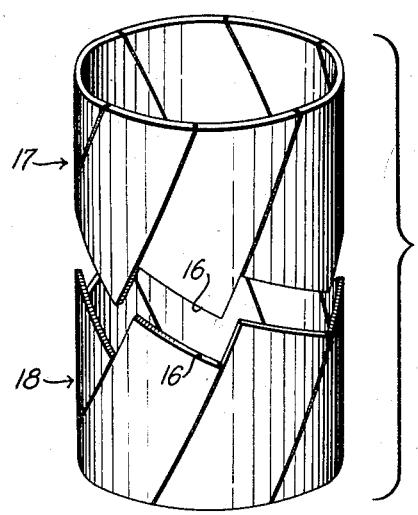
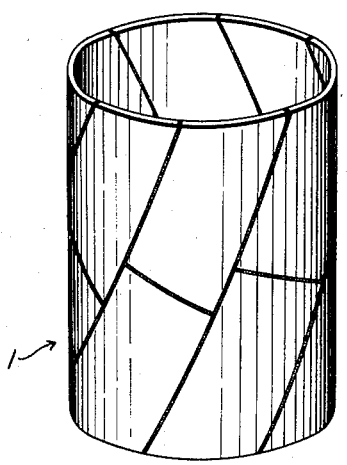
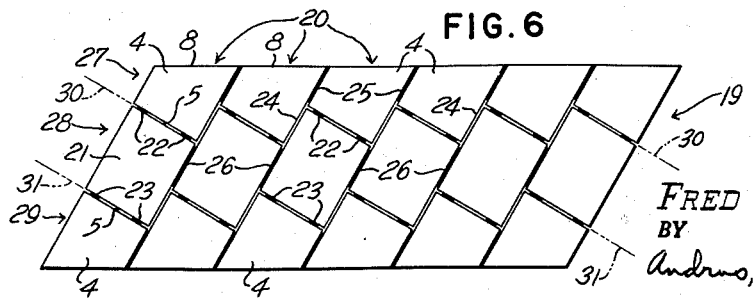
INVENTOR.
FRED A. CARSTENS
BY
Andrus, Scales & Starke
Attorneys 2,948,061

METHOD OF FABRICATING CYLINDRICAL SHELL STRUCTURES

Fred A. Carstens, Milwaukee, Wis., assignor to A. O. Smith Corporation, Milwaukee, Wis., a corporation of New York Filed Jan. 13, 1958, Ser. No. 708,617

6 Claims. (Cl. 29—463)

This invention relates to a cylindrical shell structure and method of making the same.

In various applications the industry has seen fit to employ cylindrical drying rolls of appreciable size, measuring at times more than twelve feet in diameter and fifteen feet in length. Such roll shells are conventionally made of special grades of cast iron, and in the present status of the art, the exploitation of the physical and mechanical properties of cast iron have reached their practical limits, since at the mechanically required wall thickness, the rate of heat transfer through the wall of the roll shell does not permit the use of higher circumferential drying speeds.

It has been suggested that in order to attain higher production speeds, the roll shells be fabricated from materials having greater heat conductivity such as copper or aluminum and alloys thereof commonly referred to as bronzes. For metallurgical reasons, the bronzes do not lend themselves to casting into large cylindrical shell structures of the desired proportion. These materials are, however, available in readily weldable plate form and since the plates are of limited size a number of them are necessary to fabricate a shell structure of large proportions.

In the fabrication of such a welded roll shell several matters influence the structural design. The rate of heat transfer between the weld metal and parent metal will differ. Further, expansion properties of the weld metal and parent metal will differ and certain circumstances in the use of such a drying roll will present fatigue-producing conditions. Because of these conditions, the weld seams cannot be placed in conventional straight longitudinal and circumferential lines but must be arranged in an angular pattern which on the shell produces a pattern of helical lines.

While the method of this invention may be employed in the fabrication of shells of more usual dimensions, it is particularly adapted for shells which, due to a combination of length, thickness, and diameter are so large as to exceed the capacities of known forming facilities.

According to the invention, a shell structure is formed from a plurality of relatively small parallelogram-shaped plates having adjacent sides of unequal length. Each plate is cut on a bias to divide the plate into two sections. The ends of the two sections corresponding to the short sides of the original plate are suitably machined for welding, placed in adjacent aligned relation with the sections disposed longitudinally, and temporarily tack welded together to form a rhomboidal plate member having a dimension as measured on a line normal to and between the narrow ends corresponding to the length of the shell structure. After the long sides of each rhomboidal plate member are suitably machined for welding as many plate members as are required by the shell circumference are placed in longitudinally aligned relation with the long side of each plate member being disposed adjacent the long side of the next plate placing the tack-welded joints of adjacent plate members in parallel, offset relation. The edges between adjacent plate members are then seam welded from each end inwardly to a location adjacent the respective tack-welded joints leaving the offset distance between the tack-welded joints of adjacent plate members unwelded to form a large rhomboidal shell blank whose width corresponds to the length of the shell structure and whose length corresponds to the shell circumference. The tack welds are now severed leaving two blank portions, each having a saw-tooth edge which accurately match each other. Each blank portion is then separately formed into a cylinder and their free ends welded together. The resulting cylinders are next assembled together along the saw-tooth edges and matched in the same relation as existed in the original flat blank and welded together to form the shell structure.

The accompanying drawings illustrate the best mode presently contemplated for carrying out the invention. In the drawings:

Figure 1 is a plan view of a relatively small plate member as is employed in making the shell structure of this invention and a dot-dash line indicates how the plate may be severed on a bias;

Fig. 2 is a plan view showing how the severed plate sections are reassembled and tack welded together to form a relatively small rhomboidal plate member;

Fig. 3 is a plan view showing how a plurality of the small rhomboidal plate members are assembled and welded together to form the large rhomboidal shell blank and a dot-dash line indicates how the blank is severed to form a pair of blank portions;

Fig. 4 is a perspective view of the shell blank portions after the same have been separately formed into cylinders and indicates how the cylinders are assembled together in preparation for welding along the matched saw-tooth edges;

Fig. 5 is a perspective view showing the welded shell structure of this invention; and Fig. 6 is a view similar to Fig. 3 and shows an embodiment of the invention wherein the large rhomboidal shell blank is adapted to be severed into a plurality of shell blank portions as indicated by the dot-dash lines, each of which is separately formable into cylindrical members having matched saw-tooth edges.

Referring to the drawings, the shell structure 1 shown in Fig. 5 is fabricated from a plurality of relatively small rectangular plates 2 shown in Figure 1. The plates 2 are preferably of readily weldable material having a high heat conductive capacity such as the bronzes.

Each plate 2 is cut on a bias across the narrow dimension of the plate as indicated by the dot-dash line 3 shown in Figure 1 to provide a pair of trapezoidal plate sections 4 of substantially the same size and shape. The square ends 5 of each pair of trapezoidal plate sections 4 are suitably machined for welding and disposed in adjacent relation with the plate sections aligned longitudinally. The ends 5 are then temporarily secured together by means of a tack-welded joint 6 to form the rhomboidal plates 7 of Fig. 2. The dimension as measured on a line normal to and between the narrow ends 8 of plates 7 corresponds generally to the length of the shell structure to be fabricated.

The long sides 9 of the rhomboidal plates 7 are then suitably machined for welding and a plurality of the plates are disposed in longitudinal arrangement with the the long sides 9 in adjacent relation and the narrow ends 8 in aligned relation placing the tack-welded joints 6 of the adjacent plates in parallel, offset relation. The adjacent plates 7 are welded together along the long sides 9 with the welds 10 and 11 respectively extending outwardly from the respective tack-welded joints 6 leaving the offset distance between the tack-welded joints unwelded. An adequate number of plates 7 are welded together as required by the circumference of the shell structure 1 to form the large rhomboidal blank 12 of Fig. 3.

The tack-welded joints 6 are next severed forming separate blank portions 13 and 14 shown to either side of the dot-dash line 15 of Fig. 3 and having opposed matching saw-tooth edges 16.

Each of the blank portions 13 and 14 are individually shaped into cylindrical members and the opposite ends of each blank portion are welded together to form the cylinders 17 and 18 shown in Fig. 4. As further shown in Fig. 4, the cylinders 17 and 18 are brought into aligned relation with the saw-toothed edges 16 in opposed relation. Furthermore, the saw-toothed edges 16 are brought together in the same relationship that existed in the flat blank 12 so that the edges will be exactly matched. The matched saw-toothed edges 16 are then finally welded together to form the shell structure 1 of Fig. 5 having all the weld seams arranged in a pattern of helical lines.

When the shell structure 1 is to be of such proportions that the combination of length, thickness, and diameter of each cylinder 17 and 18 exceeds the capacities of available forming facilities, then the embodiment of Fig. 6 may be employed. According to Fig. 6, the large rhomboidal blank 19 is made up of a plurality of smaller rhomboidal plates 20. Each rhomboidal plate 20 comprises a pair of plate sections 4 cut from a plate 2 in the manner shown in Figure 1. After proper machining the square ends 5 of plate sections 4 are disposed in aligned facing relation and a rectangular plate 21 of the same width is interposed therebetween and secured to the respective ends 5 by means of temporary tack-welded joints 22 and 23. Obviously, the length of plates 21 is governed and must be within the capacity of the available shell forming equipment.

After the long sides 24 of rhomboidal plates 20 are properly machined for welding, a plurality of the plates 20 are disposed in longitudinal arrangement with the long sides in adjacent relation and with the narrow ends 8 of plate sections 4 in aligned relation placing the tack-welded joints 22 and 23 of each rhomboidal plate in parallel offset relation from the corresponding joints of the next adjacent rhomboidal plate. The adjacent rhomboidal plates are then welded together along the adjoining long sides 24 with the welds 25 joining the engaging portions of adjacent plate sections 4 and welds 26 joining the engaging portions of the rectangular plates 21 leaving the offset distance between the corresponding tack-welded joints unwelded. As many plates as are required by the circumferential dimension of the shell structure are welded together to form the large rhomboidal blank 19 of Fig. 6.

The rhomboidal blank 19 may then be severed along the tack-welded joints 22 and 23 to provide separate blank portions 27, 28 and 29 shown outwardly from and between the interrupted dot-dash lines 30 and 31. Severed in this manner, each blank portion will have a saw-tooth edge that exactly matches the saw-tooth edge of the adjacent blank portion. After the separate blank portions are formed into cylindrical members the matched edges can be brought together in the same relationship as in the original blank and welded together to provide the shell structure.

While only one rectangular plate 21 is shown disposed between plate sections 4 in the individual rhomboidal plates 20 of Fig. 6, any number of such plates can be disposed between plate sections 4 to fabricate a shell structure of any desired length.

Various modes of carrying out the invention are contemplated as being within the scope of the following claims particularly pointing out and distinctly claiming the subject matter which is regarded as the invention.

I claim:

1. In a method of fabricating a cylindrical structure, the steps of providing a plurality of trapezoidal plates having a square end and correspondingly equal angles, temporarily securing to the square end of each trapezoidal plate and in longitudinal alignment therewith a second plate having a square end and a width corresponding to that of the trapezoidal plate to form a plurality of plate members each having parallel sides normal to the temporarily secured square ends and an oblique end, arranging a plurality of plate members in longitudinal arrangement side to side and with the oblique ends in longitudinally aligned relation and thereby placing the temporarily secured square ends of the respective plate members in parallel, offset relation, welding the adjacent plate members together along their sides with the welds extending outwardly from the respective offset temporarily secured square ends leaving the offset distance between the temporary securements unwelded, said arrangement of plate members including as many members as are required for the circumference of the cylindrical structure, breaking the temporary securement to form individual blank portions having opposed, matched saw-tooth edges, individually shaping the blank portions into cylindrical form and joining the opposed free ends of the blank portions together to provide a pair of cylinders, arranging the pair of cylinders with saw-toothed edges in adjacent and matched relation, and welding the cylinders together along the saw-toothed edges to form the cylindrical structure.

2. A method of fabricating a cylindrical shell structure from a plurality of rectangular plates, comprising cutting each plate on a similar bias intermediate its ends to form a pair of substantially identical trapezoidal plate sections each having a square end and opposed oblique end, placing the trapezoidal plate sections formed from each rectangular plate in longitudinal alignment with the square ends in facing relation, temporarily securing the facing square ends together to form a rhomboidal plate member having parallel long sides normal to the temporarily secured square ends and parallel oblique ends, arranging a plurality of the rhomboidal plate members in longitudinal relation long side to long side with the oblique ends being longitudinally aligned and thereby placing the temporarily secured square ends of the adjacent rhomboidal plate members in parallel offset relation, welding the rhomboidal plate members together at their long sides to form a rhomboidal blank with the welds extending outwardly from the respective offset temporary securements and leaving unwelded the offset distance between the temporary securements, said rhomboidal blank including as many rhomboidal plate members as required for the circumference of the shell structure, severing the temporary securements joining the trapezoidal plate sections to form a pair of blank portions having opposed, matched saw-tooth edges, individually shaping the blank portions into cylindrical form and joining the opposed free ends together to provide a pair of cylinders, arranging the cylinders with the saw-toothed edges in adjacent and matched relation, and welding the cylinders together along the saw-toothed edges to form the shell structure.

3. A method of fabricating a cylindrical shell structure from a plurality of rectangular plates, comprising cutting each plate on a similar bias intermediate its ends to form a pair of trapezoidal plate sections each having a square end and opposed oblique end, placing the trapezoidal plate sections formed from each rectangular plate in longitudinally aligned relation with the square ends in adjacent relation and temporarily tack welding the square ends of the plate sections together to form a rhomboidal plate member having parallel long sides normal to the tack welded square ends and parallel oblique ends, arranging a plurality of the rhomboidal plate members in longitudinal relation long side to long side with the parallel oblique ends being longitudinally aligned and thereby placing the tack welded square ends of the respective plate members in parallel offset relation, welding the rhomboidal plate members together at their adjacent long sides with the welds extending inwardly from the aligned oblique ends to the adjacent tack welded square ends leaving the offset distance between the tack welded square ends unwelded, said arrangement of rhomboidal plate members including as many members as are required for the circumference of the shell structure and forming a relatively large rhomboidal blank, severing the tack welds joining the trapezoidal plate sections to form a pair of blank portions having opposed, matched saw-toothed edges, individually shaping the blank portions into cylindrical form and joining the opposed ends together to provide a pair of cylinders, arranging the pair of cylinders with saw-toothed edges in adjacent and matched relation, and welding the cylinders together along the saw-toothed edges to form the shell structure.

4. A method of fabricating a cylindrical shell structure, comprising cutting a plurality of rectangular plates on a similar bias intermediate their ends to form from each plate a pair of trapezoidal plate sections each having a square end and an opposed oblique end, placing the trapezoidal plate sections formed from each rectangular plate in longitudinally aligned relation with the square ends in facing relation and interposing between said square ends a rectangular plate having the same width, temporarily securing the square ends of the trapezoidal plates to the respective ends of the rectangular plate to form a rhomboidal plate member having parallel long sides and parallel oblique ends, arranging a plurality of the rhomboidal plate members in longitudinal relation long side to long side with the oblique ends being longitudinally aligned and thereby placing the corresponding temporarily secured joints of adjacent rhomboidal plate members in parallel, offset relation, welding the rhomboidal plate members together at their adjacent long sides with the welds joining the engaging portions of the adjacent trapezoidal plates and rectangular plates and leaving unwelded the offset distance between the corresponding temporarily secured joints, said arrangement of rhomboidal plate members including as many members as are required for the circumference of the shell structure and forming a relatively large rhomboidal blank, breaking the temporarily secured joints of the rhomboidal blank to provide three blank portions having opposed, matched saw-toothed edges, individually shaping each blank portion into cylindrical form and joining the opposed ends together to provide three cylindrical members, arranging the cylindrical members to place the saw-toothed edges in adjacent and matched relation, and welding the cylinders together along the saw-toothed edges to form the shell structure.

5. A method of fabricating a cylindrical shell structure, comprising cutting a plurality of rectangular plates on a similar bias intermediate their ends to form from each plate a pair of trapezoidal plate sections each having a square end and an opposed oblique end, placing the trapezoidal plate sections formed from each rectangular plate in longitudinally aligned relation with the square ends in facing relation and interposing therebetween in aligned relation at least one rectangular plate section having the same width, temporarily securing together the ends of said aligned trapezoidal and rectangular plate sections to form a rhomboidal plate member having parallel long sides and parallel oblique ends, arranging a plurality of the rhomboidal plate members in longitudinal relation long side to long side with the oblique ends being longitudinally aligned and thereby placing the corresponding temporarily secured joints of adjacent rhomboidal plate members in parallel, offset relation, welding the rhomboidal plate members together at their adjacent long sides with the welds joining the engaging portions of the adjacent plate sections and leaving unwelded the offset distance between the corresponding temporarily secured joints, said arrangement of rhomboidal plate members including as many members as are required for the circumference of the shell structure and forming a relatively large rhomboidal blank, breaking the temporarily secured joints of the rhomboidal blank to provide a plurality of blank portions each having a saw toothed edge that matches the edge of the adjacent blank portion, individually shaping each blank portion into cylindrical form and joining the opposed ends together to provide a plurality of cylindrical members, arranging the cylindrical members to place the saw-toothed edges in adjacent and matched relation, and welding the cylinders together along the saw-toothed edges to form the shell structure.

6. A method of fabricating a cylindrical shell structure from a plurality of parallelogram-shaped plates having adjacent sides of unequal length comprising cutting each plate on a similar bias intermediate its shorter sides to form a pair of equi-angular plate sections; placing the pair of plate sections in longitudinal alignment with the short sides of the original parallelogram-shaped plates in adjacent relation; temporarily securing said short sides together to form a rhomboidal plate member having adjacent sides of unequal length and with the parallel long sides being intercepted by the temporary securement, arranging a plurality of the rhomboidal plate members in longitudinal relation long side to long side with the short sides in longitudinal alignment and thereby placing the temporary securements of the adjacent rhomboidal plate members in parallel, offset relation; welding the rhomboidal plate members together at their long sides to form a rhomboidal blank with the welds extending outwardly from the respective offset temporary securements and leaving unwelded the portion of the adjacent long sides of the respective plate members extending between the temporary offset securements, said rhomboidal blank including as many rhomboidal plate members as required for the circumference of the shell structure; severing the temporary securements joining the equi-angular plate sections of the rhomboidal blank to form a pair of blank portions having opposed, matched saw-toothed edges; individually shaping the blank portions into cylindrical form with said saw tooth edges at one end of each blank and joining the opposed free ends together to provide a pair of cylinders; arranging the cylinders in axial alignment with the saw-toothed edges in adjacent and matched relation; and welding the cylinders together along the saw-toothed edges to form the shell structure.

References Cited in the file of this patent
UNITED STATES PATENTS

| | | |
|---|---|---|
| 1,916,051 | Jagschitz | June 27, 1933 |
| 2,496,626 | Jackson | Feb. 7, 1950 |